United States Patent

[11] 3,578,863

[72] Inventor Richard George Farrand
 5 Ashbourne Grove, London, England
[21] Appl. No. 652,589
[22] Filed July 12, 1967
[45] Patented May 18, 1971
[32] Priority July 15, 1966
[33] Great Britain
[31] 31862/66

[54] COMPARATOR DEVICE USING PARALLAX OF TWO PHOTOGRAPHS
 2 Claims, 4 Drawing Figs.
[52] U.S. Cl. .................................................. 356/2,
 350/136, 353/5, 353/6, 356/72, 356/163
[51] Int. Cl. ..................................................... G01c11/12,
 G01n 21/00, G01h 11/00
[50] Field of Search............................................. 356/163, 2,
 72; 350/136; 353/5, 6

[56] References Cited
UNITED STATES PATENTS
| | | | |
|---|---|---|---|
| 2,871,759 | 2/1959 | Sconce et al. | 356/2 |
| 3,004,464 | 10/1961 | Leighton et al. | 356/2 |
| 3,288,018 | 11/1966 | Belchis et al. | 356/2X |
| 3,355,730 | 11/1967 | Neasham | 356/2X |
| 3,372,615 | 3/1968 | Birnbaum et al. | 356/2 |

FOREIGN PATENTS
| | | | |
|---|---|---|---|
| 538,619 | 3/1957 | Canada | 356/2 |
| 903,275 | 2/1954 | Germany | 356/2 |

*Primary Examiner*—Ronald L. Wibert
*Assistant Examiner*—Warren A. Sklar
*Attorney*—Finnegan, Henderson & Farabow ABSTRACT: This invention aims at providing a simple means for finding a location in space and for determining the three dimensional coordinates of any object which is shown on a photograph or a pair of photographs. To do this I superimpose one photograph of the object over another photograph of the same object which shows a parallax difference with respect to the first photograph and I then compare the differences in the separations of the vertical centerlines of the photographs with one of the photographs displaced horizontally relatively to the other to superimpose successively a series of pairs of images of the identical points. I also provide an apparatus for making the comparison including a viewing box with a screen and some means of fixing the photograph in relation to the screen and a carriage to move another photograph horizontally across the screen relatively to the first photograph.

COMPARATOR DEVICE USING PARALLAX OF TWO PHOTOGRAPHS

This invention relates to the determination of the location in space and the three dimensional coordinates of an object depicted in photographs or a pair of photographs comprising a stereogram.

Hitherto it has been customary to determine the dimensions of objects by stereoscopic observation of pairs of photographs taken from adjacent camera stations to ascertain the horizontal parallaxes and the dimensional coordinate positions of identical points in the photographic images of the object. Photogrammetry of this nature produces very accurate quantitative information but normally requires very accurate apparatus and skilled operators.

The object of the present invention is to provide an alternative and less complicated method of and means for achieving results similar to those obtained by the known apparatus without the necessity of specialist operators and stereoscopic vision.

According to the present invention a method of determining the location in space and the dimensional coordinates of an object depicted in a photograph consists in superimposing a photograph of the object over another photograph of the same object exhibiting parallax relative to the first photograph and measuring the differences in the separations of the vertical centerlines of the photographs when one of said photographs is displaced horizontally relatively to the other to superimpose successively a series of pairs of images of identical points.

The invention also includes a comparator comprising a viewing box having a viewing screen, means for securing a photograph in fixed relation to said screen, a carriage adapted to hold another photograph movable horizontally transversely of said screen and means for actuating said carriage.

The movement of the comparator carriage may be converted to actual dimensions of the object in several ways such as by constructing a chart based on up to five control dimensions, or by a mechanical conversion device, or by a simple analog computer needing three control dimensions and responsive to the movement of the comparator.

When the two images of a point are superimposed, the distance of a plane which contains the points in depth is related to the horizontal distance between the vertical centerlines of the two photographs. Moreover, when the distance of a point has been determined the scale of the image in the photograph can be ascertained as a function of the distance. Further, since photographic emulsions are now coated on polyester film base of good dimensional stability, it is a practical proposition to use enlarged prints on such film, or on other stable materials such as glass or metal.

The invention will be hereinafter more fully described with reference to the accompanying drawings showing a preferred embodiment, and in which.

Figure 1:
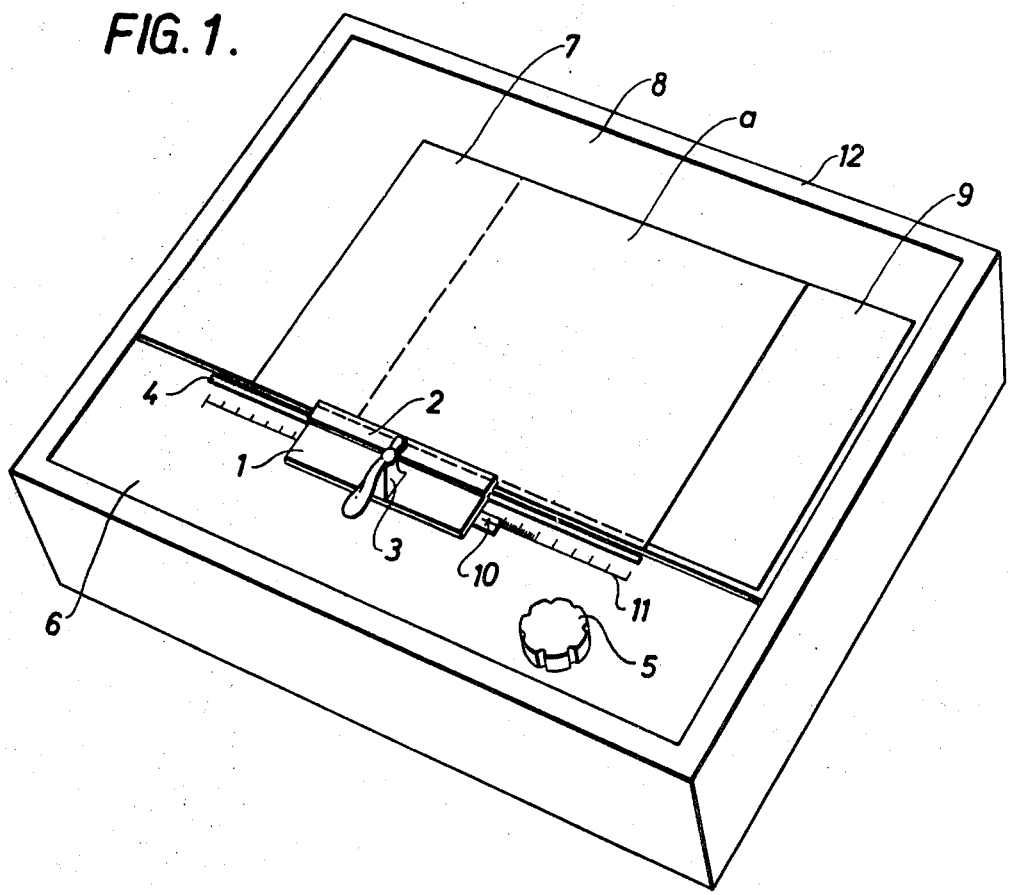
FIG. 1, shows a perspective view of one form of photocomparator.

Referring to FIG. 1, a boxlike structure 12 is provided with a table 8 which may be formed of transparent or translucent material such as glass or plastic, below which are provided lamps (not shown) adapted to illuminate the table 8 which forms a viewing screen. A picture 9 which may be an enlarged photograhic print is mounted in fixed position on the table 8 by having one edge such as the right hand edge in FIG. 1 abutting against a rim of the box 12 and its lower edge abutting against an edge of a cover plate 6. Any suitable form of adjustable clamp (not shown) may be provided to hold the picture 9 in fixed relation to the screen 8.

A carriage 1 is slidable transversely of the screen 8 by means of a downwardly projecting member (not shown) projecting through a slot 4 on the cover plate 6. A rotatable control knob 5 is connected below the cover plate 6 by any suitable transmission means (not shown) such as friction discs, gears, lever, or a wire and pulley, adapted to move the carriage 1 along the slot 4 on rotation of the knob 5.

The carriage 1 is provided with a loose clamping bar 2 between which and the carriage a second picture 7 of the same object as is depicted on the picture 9, may be clamped by a toggle clamp 3 in position in alignment with the picture 9. Movement of the sliding carriage 1 moves the picture 7 laterally across the picture 9 enabling image points common to both pictures in the overlapping area $a$ to be superimposed.

The carriage 1 carries a cursor 10 which can be viewed relatively to a scale 11 located on the cover plate 6 to provide means for measuring the lateral displacement of the carriage 1 and picture 7 necessary to produce superimposition of the images.

When taking the photographs the camera, for each pair of pictures, must be positioned with parallel optical axes and parallel with the plane of the object, but knowledge of its location, of the object-to-lens or lens-to-image distance, is not necessary if some dimensions are known with respect to key points in the space occupied by the object. It is convenient to include within the picture items of known separation towards the back and front of the object area, or of known distance apart in depth. These control dimensions may be provided by objects in the scene, such as columns or items of equipment, which are mentioned purely as examples and the positions of which are known. Alternatively, scales or targets can be placed in the scene in convenient positions. For example in the case under consideration key points at known distances may be provided in front of and behind the model, and by two intermediate objects.

For use with this comparator the photographs may be printed on to clear film, to any scale that gives a usefully large image of the object. One print is fixed to the table 8 of the comparator, the other to the sliding carriage 1 that can be moved horizontally, the two prints being registered in the vertical direction and squarely aligned. The distance between the centers of the photographs corresponds to the amount of movement of the sliding carriage that is needed to superimpose two image points. The carriage movement is shown on the scale 11 as the "Comparator Reading." With the simple comparator, these comparator readings must be converted to depth measurements and a scale factor—by which the image size in a particular plane must be multiplied to match a drawing scale—by preparing conversion charts for each pair of pictures. After the image locations providing the control dimensions have been determined the distances of all other points and the "Scale Factors" may be found through the conversion chart, from the comparator readings.

Table I shows an example of the record of Comparator readings obtained when the images of the key points are superimposed and a scale included in the picture at the front of the object has been taken as a datum. A further scale was placed at the rear of the object. The distances between the scales and the key points were measured in the object. The scale factors were found from the ratio: object width/image width.

TABLE I

| Key points | Comparator readings | Known depth distance | Calculated scale factor |
|---|---|---|---|
| Front scale | 144.4 | (¹) | 0.86 |
| Front column | 117.2 | 2.65 | |
| Centre column | 94.4 | 6.79 | |
| Rear scale | 74.3 | 13.68 | 2.36 |

¹ Datum.

Figure 2:
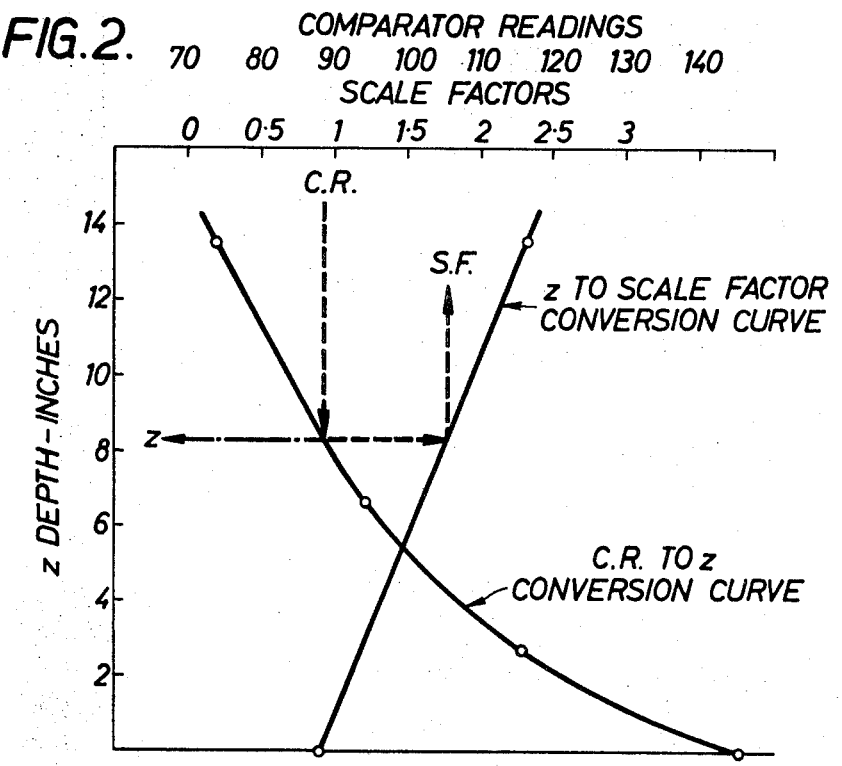
FIG. 2, shows a chart for converting the comparator readings to actual dimensions.

From these data the conversion chart in FIG. 2 was constructed. The distance and scale of all other points was then obtained from the comparator readings. To obtain the horizontal and vertical locations, dimensions were measured directly on one or another of the film prints and multiplied by the scale factor. The dimensions thus obtained can then be used to prepare tabulated measurements or to plot coordinates for isometric, perspective or orthographic drawings.

The model, illustrated in FIG. 1, has given accuracy figures of within 1 percent.

To obviate the need for preparing conversion curves for each pair of photographs, a simple analogue computer has been designed for use with the comparator. It will automatically calculate depth and scale factors from the position of the moving photograph, after the necessary constants have been applied. The control which will locate the sliding carriage will also adjust a rotating precision potentiometer, so that the position of the photograph will be linearly related to the position of the slide of the potentiometer.

Figure 3:
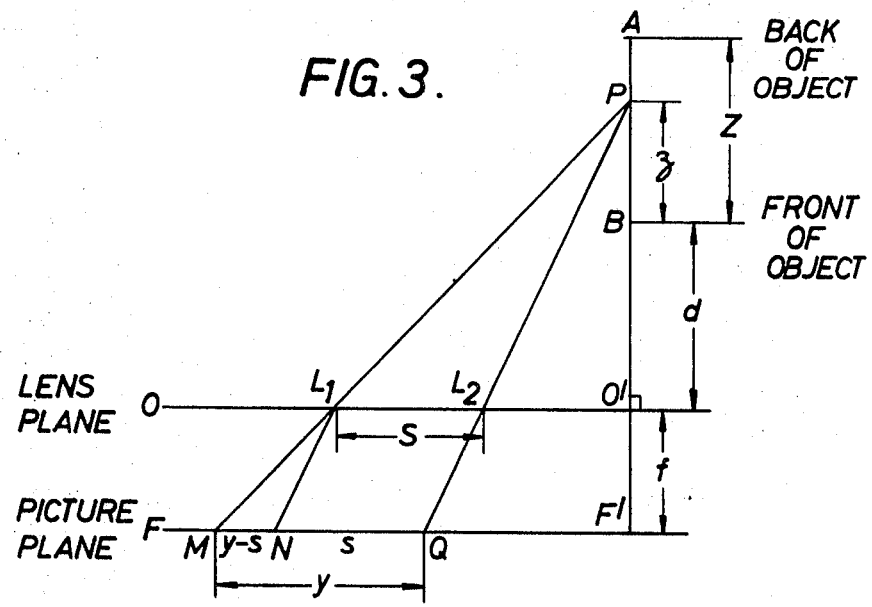
FIG. 3, shows a diagram of the geometrical relationship involved in the method of the invention.

In FIG. 3, the geometrical relationship is shown, as in a plan view. P is any point in the object a distance $z$ behind a front datum point B. A is a datum point at the rear of the object. AB=Z. Rays from P pass through the lenses $L_1$ and $L_2$ and images of P are produced in the picture plane FF' at M and Q. $L_1$ N is drawn parallel to $L_2$ Q.

It can be shown that the required distance BP is given by the equation $z(aC-C+1)=Z(1-C)$, $z$ = required depth of object from front datum;
$Z$ = known distance between front datum and back datum;
$C$ = horizontal picture position (comparator reading);

$$a = \frac{\text{width on picture of front horizontal datum}}{\text{width on picture of back horizontal datum}}$$

Figure 4:
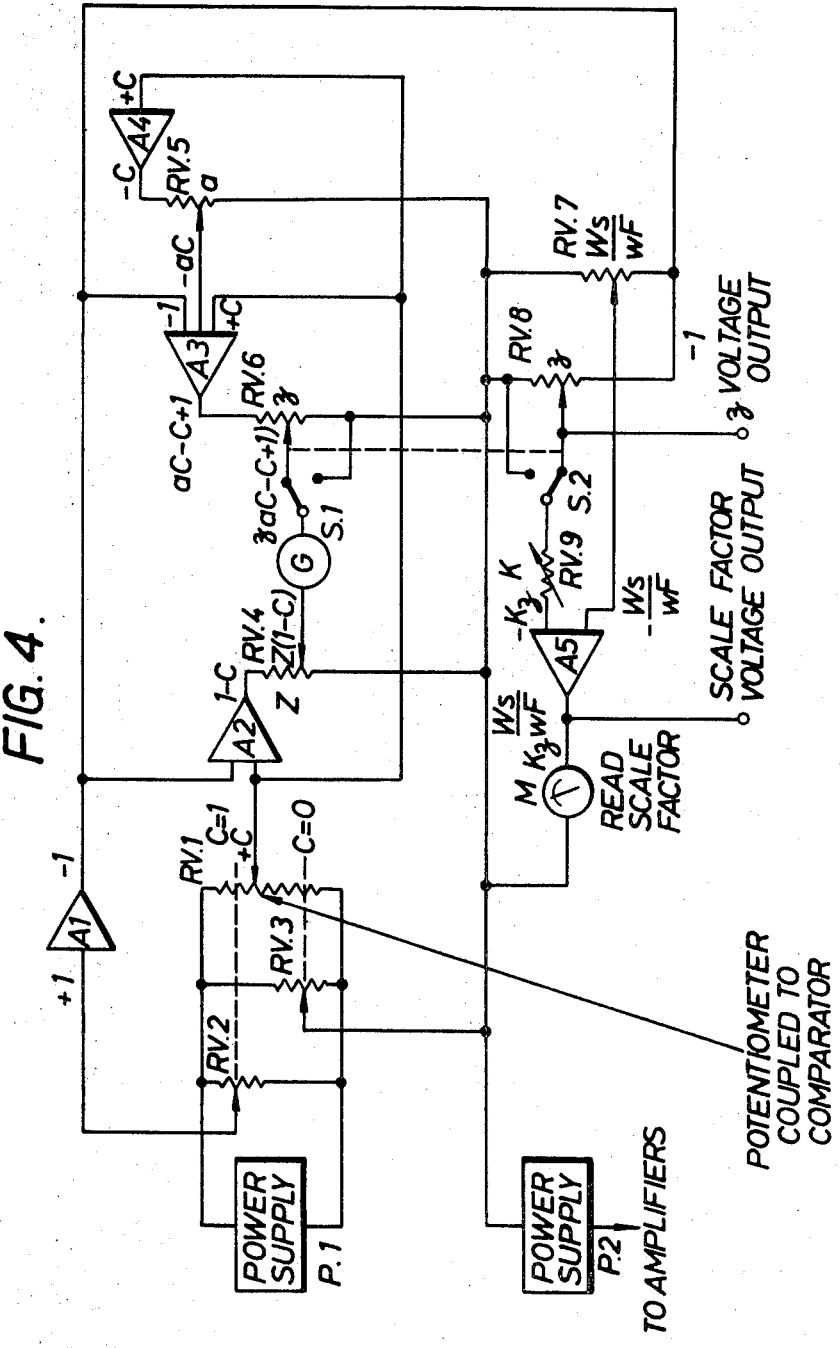
FIG. 4, shows a circuit diagram of an analog computer for use with the comparator.

Equation (1) can now be solved by the circuit shown in FIG. 4.

Potentiometer RV1 is coupled to the comparator and supplied with current from power supply P1. The voltage on its slide is thus proportional to +C. RV3, in parallel with RV1, is set to a potential equivalent to C=0 when the two images of the rear datum are coincident, and similarly RV2 is set to C=1 when the images of the front datum are coincident.

Amplifiers A1 and A2 and potentiometer RV4 are arranged to give a voltage equivalent to $Z(1-C)$. Amplifiers A3 and A4 and potentiometers RV5 and RV6 give a voltage equivalent to $z(aC-C+1)$. The difference between these voltages is reduced to zero, as indicated by galvanometer G, by adjustment of RV6, the setting of which gives the required value of $z$. The known constants Z and a are set in by potentiometers RV4 and RV5 respectively. The switch $S_1$ makes $z=0$ and enables RV2 to be set to $C=1$ when the images of the front datum have been lined up.

A voltage output equivalent to $-z$ is available from the slide of RV8 which is ganged to RV6. This could be used for direct read out of $z$ on a digital voltmeter and/or recorded in digital form on punched paper tape suitable for computer processing.

The scale factor S is given by $$S = Kz + \frac{W_s}{W_F}$$

where $$K = \frac{W_s}{W_F} \frac{(a-1)}{Z}$$

$W_s$ = width of front datum
$W_F$ = width of image of front datum

The potentials equivalent to $-z$ and $W_s/W_F$ are produced by potentiometers RV8 and RV7 respectively, RV8 being ganged to RV6. A variable resistor RV9 multiplies $z$ by K and amplifier A5 sums $-Kz$ and $-(W_s/W_F)$ producing an output S which is measured on meter M. No scales are necessary on RV7 and RV9 since known value of S when $z=0$ and $z=Z$ can be set directly on the meter M. The switch S2 puts $z=0$ to facilitate this setting up procedure. The scale-factor voltage from A5 is brought out to allow more accurate measurement by digital voltmeter and/or recording in digital form for computer processing if required.

The operating procedure requires key-point dimensions in the object and in the film print to be known as before, and calculation of the following constants:

$$a = \frac{W_F}{W_B}$$

$$S_0 = \frac{W_s}{W_F}$$

scale factor for $z=0$;

$$S_z = a\frac{W_s}{W_F} = \frac{W_s}{W_B}$$

scale factor for $z=Z$

The setting up procedure will then be as follows:
1. Set Z potentiometer (RV4) and $z$ potentiometer (RV6) to Z.
2. Set a potentiometer (RV5) to correct value of $a$.
3. Line up images of object at $z=0$ on photographs and adjust RV2 to give zero reading on G when S1 is depressed.
4. Line up images of object at $z=Z$ on photographs and adjust RV3 to give zero reading on G.
5. Depress S2 and adjust RV7 to give scale-factor reading of $W_s/W_F$ on meter M.
6. Adjust RV9 to give scale-factor reading on $W_s/W_B$ on meter M.
7. For measuring the depth $z$ of an object, line up its images, adjust RV6 to give zero reading on G and read the value of $z$ on RV6. Read scale factor on M.

It is envisaged that the digital output from the analogue computer, recorded in suitable form (e.g. punched tape or card) could be programmed in a digital computer for example to provide material and quantity lists and data for a numerically controlled drawing machine or a machine tool or an automatic drawing machine or machine tool. It may also be possible to use the coordinates and scale factors with an electronic pencil, with which the shapes of the image of an object may be traced, the output from which would be corrected perspective data for use in the same way.

The potential usefulness of this instrument therefore ranges from simply finding the distance between two points, to automatically tabulating and drawing a description of an object, without referring to the object itself.

I claim:
1. A method of determining the three dimensional coordinates of an object depicted in first and second positive photographs, the second positive photograph exhibiting parallax relative to the first positive photograph, which comprises:
   defining a vertical centerline in each of said first and second positive photographs, the centerline in the first positive photograph having the same relative position and orientation as the centerline in the second positive photograph relative to the object depicted in said photographs;
   superimposing said first positive photograph of the object over said second positive photograph of the same object;
   aligning the centerlines of said photographs to obtain a reference position;
   displacing one of said photographs laterally in a direction perpendicular to the centerlines and relative to the other photograph to superimpose successively a series of pairs of images of identical points; and
   measuring the differences in the separations of the vertical centerlines of said photographs at a point of coincidence of each of said pairs of images, said differences in the separations having a functional relationship to the actual three dimensional coordinates of the object, and converting the resultant measurements of the differences in the separations into actual coordinates of said object.

2. A method of obtaining a measurement which is related to the depth of an object depicted in first and second positive photographs, the second positive photograph exhibiting parallax relative to the first positive photograph, which comprises:
   defining a vertical centerline in each of said first and second positive photographs, the centerline in the first positive photograph having the same relative position and orientation as the centerline in the second positive photograph relative to the object depicted in said photographs;
   superimposing said first positive photograph of the object over said second positive photograph of the same object;

aligning the centerlines of said photographs to obtain a reference position;

displacing one of said photographs laterally in a direction perpendicular to the centerlines and relative to the other photograph to superimpose images of identical points which appear in said photographs; and measuring the distance between the vertical centerlines of said photographs when said images of identical points are superimposed to obtain a measurement related to the depth of the object.